UNITED STATES PATENT OFFICE.

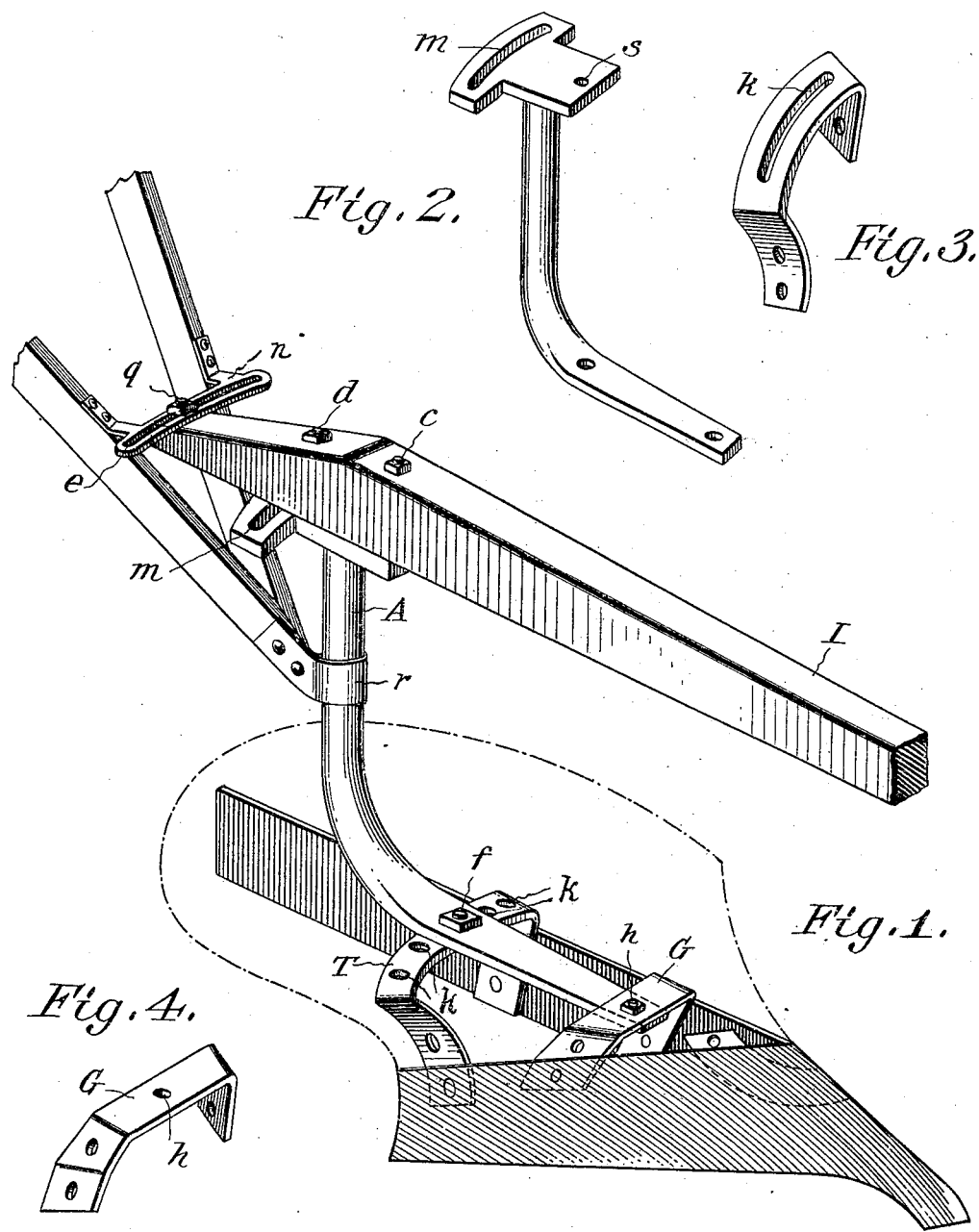

FRANK REUBEN MOSHER, OF PARLIER, CALIFORNIA.

PLOW.

938,686.  Specification of Letters Patent.  Patented Nov. 2, 1909.

Application filed June 11, 1908. Serial No. 437,973.

*To all whom it may concern:*

Be it known that I, FRANK REUBEN MOSHER, of Parlier, county of Fresno, State of California, have invented an Improvement in Plows, of which the following is a specification.

My invention relates to plows, and its object is to permit a wide adjustment of the standard, together with the beam, and at any adjustment desired the beam can parallel the land. The wide adjustment secured by my invention is desirable especially in vineyard and orchard plows inasmuch as an adjustment can be secured whereby the plow can be run near the trunks of the vines and trees without danger of breaking the tender sprouts and twigs growing near the ground because of the proximity of the plow to such vines and trees. The fact that the beam is kept parallel to the land in the different adjustments of which the plow is capable makes the plow run easier and less liable to breakage.

My invention consists in the peculiar construction of the standard, and the device by which it is attached to the beam and to the plow frame, hereinafter more particularly described.

Figure 1 is an isometrical view of the plow embodying my invention. Fig. 2 is a view of the standard. Fig. 3 is a view of the brace which acts as a rest for the heel of the standard and which can be substituted for brace T shown in Fig. 1. Fig. 4 is a frog to which the toe of the standard is fastened.

I is the plow beam which is adjustable in the rear by a device in ordinary use, viz: a support, $n$, for the beam containing a slot in the line of an arc, $e$, in which bolt $q$ will slide laterally when loosened, and by which the beam can be securely fastened by tightening the nut on the bolt $q$.

Frog G is a flat piece of metal having an ear on one side which fits snugly against the landside, to which it is securely bolted near the front of the plow frame, and an ear on the other side bent in an irregular curve to fit snugly against the lower end of the moldboard and adjacent portion of the plowshare, to which pieces said frog is securely bolted.

Brace T, otherwise shown as Fig. 3, is a flat piece of metal having an ear on one side which fits snugly against the landside, to which it is bolted back of frog G, said brace having on the other side an ear which fits against the moldboard and adjacent portion of the plowshare, as shown in Fig. 1, being bolted firmly to said moldboard and plowshare. Brace T has a row of holes, or a slot in the line of an arc of a circle having the pivot $h$ for its center. Brace T and frog G are attached to the plow so that the tops form a horizontal plane.

The standard A (Fig. 2.) consists of an upright and a foot, the top of the upright portion terminating with a platform which serves as a rest for the plow beam. Said platform has hole $s$ at the front and slot $m$ at the rear. Slot $m$ describes the arc of a circle having bolt hole $s$ for its center. The standard A is fastened to the beam by bolt $c$ passing through the hole $s$ and the beam, and by bolt $d$ passing through slot $m$ and the beam. The foot of standard A is fastened to the plow frame by a round bolt through hole $h$ in frog G (at the front of the plow frame) and through the toe of standard A, and by bolt $f$, passing through one of the series of holes $k$ (or slot $k$) in brace T, and through a hole in the heel of standard A. When the nut on the bolt $h$ is loosened and bolt $f$ removed, the upright of standard A can swing in the line of the holes $k$, and when the adjustment of the standard to or from the land is secured, the standard can be rigidly fastened to the plow frame by replacing bolt $f$ and tightening the nuts on said bolt $f$ and a bolt $h$. Some other form of hinge may be used to fasten the toe of standard A to frog G, but the device above described is deemed preferable in my construction.

When the adjustment of standard A is secured as described, nuts on bolts $q$, $d$ and $c$ can be loosened and the plow beam swung on bolt $c$ as a pivot until said beam is parallel with the land, after which nuts $d$ and $c$ can be tightened and the handles of the plow adjusted by swinging them to the right or to the left, the standard where clasped by clamp $r$ being the pivot, after which nut on bolt $q$ can be tightened, thereby securing the handles rigidly to the plow.

I am aware that all the mechanism described in the foregoing is not wholly new.

What I do claim as new and as my invention, and upon which I desire to secure Letters Patent is:

In a plow, in combination with the plow frame, plow beam I, frog G, and brace T, of standard A, consisting substantially of an upright bar of metal terminating at the top with a platform forming a rest for the plow beam I, having hole $s$ and slot $m$, and
5 terminating at the bottom with a foot containing holes at the toe and the heel where bolts $h$ and $f$ pass through, the toe of said foot being fastened to the frog G with a round bolt, and the heel thereof to brace T in one of a series of holes $k$, in the line of 10 an arc, all substantially as described.

FRANK REUBEN MOSHER.

Witnesses:
E. F. KENNEDY,
J. W. KENNEDY.